(12) United States Patent
Mojica (10) Patent No.: US 10,948,006 B2
(45) Date of Patent: Mar. 16, 2021

(54) CARABINER WITH CONTAINER GATE

(71) Applicant: Outdoor Element, LLC, Englewood, CO (US)

(72) Inventor: Michael John Mojica, Englewood, CO (US)

(73) Assignee: Outdoor Element, LLC, Englewood, CO (US)

(*) Notice: Subject to any disclaimer, the term of this patent is extended or adjusted under 35 U.S.C. 154(b) by 0 days.

(21) Appl. No.: 16/657,490

(22) Filed: Oct. 18, 2019

(65) Prior Publication Data
US 2020/0124082 A1 Apr. 23, 2020

Related U.S. Application Data

(60) Provisional application No. 62/747,954, filed on Oct. 19, 2018.

(51) Int. Cl.
*F16B 45/02* (2006.01)
(52) U.S. Cl.
CPC .................... *F16B 45/02* (2013.01)

(58) Field of Classification Search
CPC .................... F16B 45/02; Y10T 24/45319
See application file for complete search history.

(56) References Cited

U.S. PATENT DOCUMENTS

| | | | |
|---|---|---|---|
| 6,715,898 B1* | 4/2004 | Huang | F16B 45/02 362/116 |
| 7,125,186 B1* | 10/2006 | Stokes | B43K 7/005 401/8 |
| 9,638,237 B2* | 5/2017 | Yeh | F16B 45/02 |
| 10,655,854 B2* | 5/2020 | Mojica | F16B 45/02 |

\* cited by examiner

*Primary Examiner* — Robert Sandy
(74) *Attorney, Agent, or Firm* — Venable LLP; Keith G. Haddaway (57) ABSTRACT

A carabiner having a container or empty section with the gate or solid gate. The gate may have a cap with a threaded section such that when the gate is pulled away from the body, the cap may be screwed off to reveal the empty section of the gate. The empty section may store items for the user. The cap may be received into the nose section of the carabiner when the spring forces the gate closed. A fire starting implement may be provided on the carabiner. The gate may rotate inward or outward with respect to the carabiner body.

17 Claims, 9 Drawing Sheets

CARABINER WITH CONTAINER GATE

CROSS-REFERENCE TO RELATED APPLICATIONS

This application claims priority to U.S. Provisional Application No. 62/747,954 filed Oct. 19, 2018, herein incorporated by reference in its entirety.

TECHNICAL FIELD

The present application relates to carabiner with a container gate.

BACKGROUND

A carabiner is a mechanical device used, for example, to link rope, slings, and other climbing aids together. Carabiners may be used in rock climbing, for holding keys, anchoring hammocks, holding packs together, suspending gear off the ground, and other activities. Carabiners generally have a body with one side having a hinged arm that serves as agate. The gate may be spring loaded and biased to a normally closed position. Conventional carabiners provide for solid gates. The solid gates house a compression spring for holding the solid gate in the closed position. Conventional carabiners may alternatively be provide with a wire gate.

BRIEF SUMMARY

According to an embodiment of the present disclosure a carabiner may include a body; and a gate pivotally coupled to the body. The gate may include a gate body having a first gate body portion having a first cavity and a second gate body portion for pivotally coupling to the body; a gate cap removably coupled to the gate body, the gate cap having a second cavity configured to align with the first cavity to form a container; and a seal configured to provide a water tight seal for the container. The container may be configured to receive a stored item.

BRIEF DESCRIPTION OF DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art would recognize that other equivalent parts can be employed and other methods developed without departing from the spirit and scope of the invention. All references cited herein are incorporated by reference as if each had been individually incorporated.

The present disclosure relates to a carabiner having a container or empty section within the gate or solid gate. The gate may have a cap with a threaded section such that when the gate is pulled away from the body, the cap may be easily screwed off to reveal the empty section of the gate. The cap may be received into the nose section of the carabiner when the spring forces the gate closed. In some embodiments, a fire starting implement may be provided on the carabiner. According to an embodiment, the gate may pivot away from or outward with respect to the carabiner body. According to an embodiment, the gate may pivot towards or inward with respect to the carabiner body.

Figure 1:
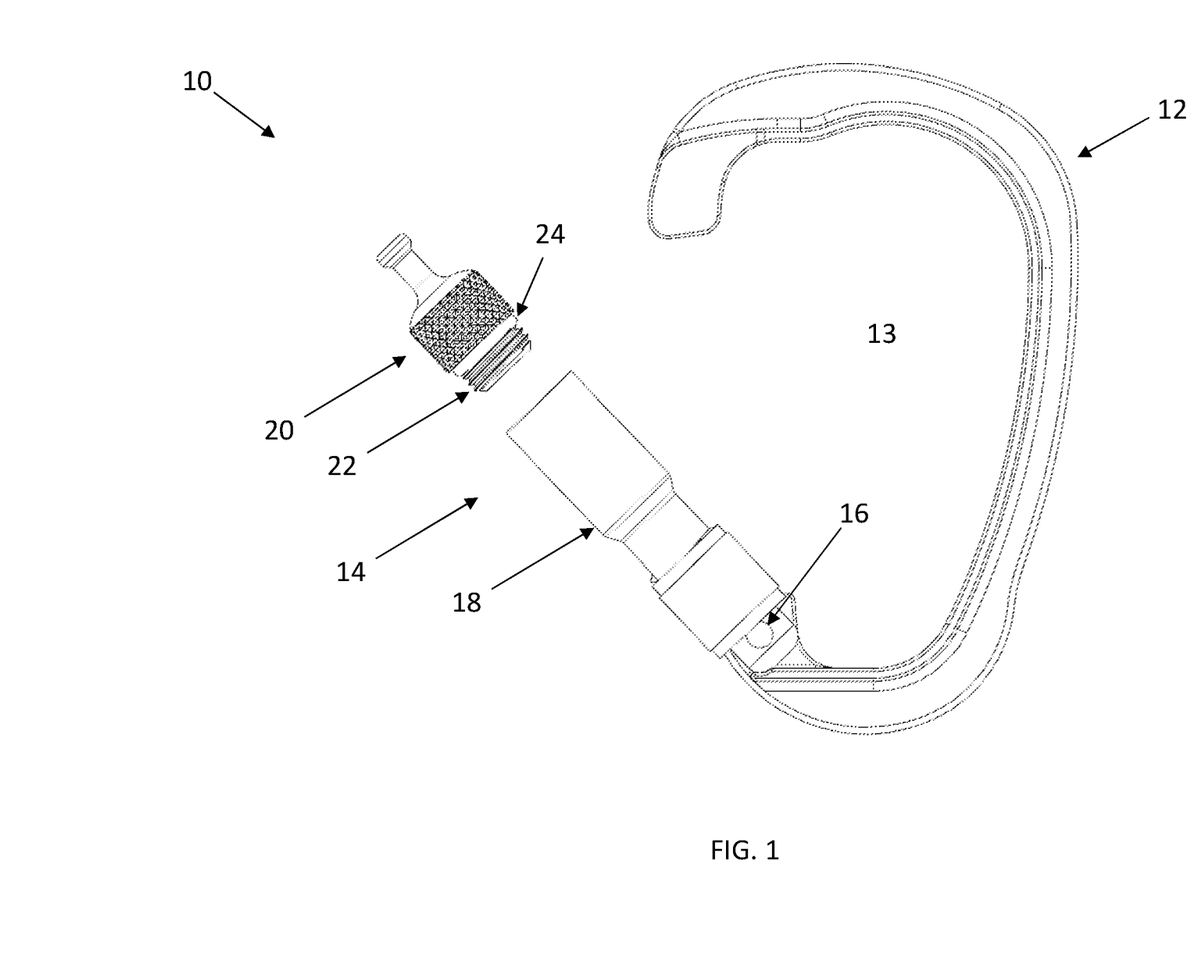
FIG. 1 shows a front view of a carabiner with container gate, according to an embodiment of the disclosure.
Figure 2:
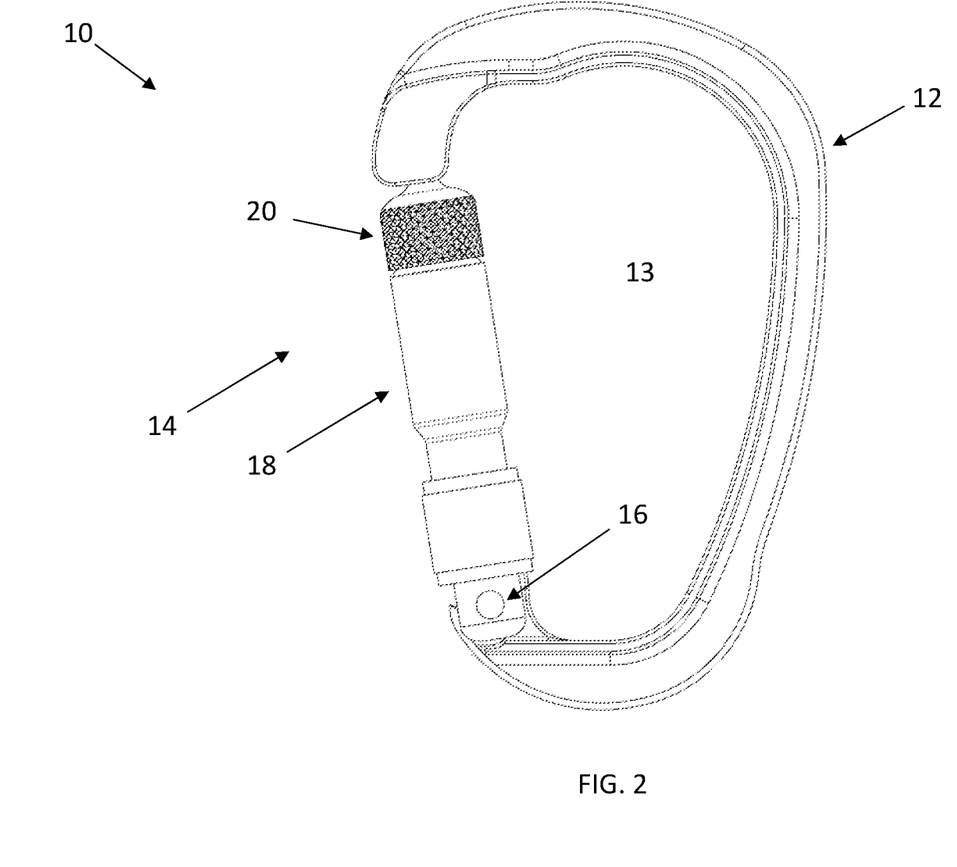
FIG. 2 shows a front view of the carabiner with container gate of FIG. 1 in a closed position, according to an embodiment of the disclosure.

Referring to FIGS. 1 and 2, a carabiner 10 is shown. The carabiner 10 may be formed of a lightweight, high strength material. For example, the carabiner 10 may be formed of a heat-treated aluminum alloy or steel. The carabiner 10 may have a body 12 and an arm 14. The body 12 may be curved or "C" shaped. The arm 14 may be hinged to the body 12. The arm 14 and the body 12 may together form a ring. The ring may be oblong, oval, pear, "D" shaped, or other closed shapes or combinations thereof.

The arm 14 may be coupled to the body 12 at a pivot point 16. The pivot point 16 may allow the arm 14 to hinge, pivot, or rotate with respect to the body 12. According to an embodiment, the pivot point 16 may allow the arm 14 to hinge outward with respect to the body 12. For example, the arm 14 may pivot in a manner that is coplanar with the body 12. The arm 14 may hinge between an open position (FIG. 1) and a closed position (FIG. 2). The arm 14 may be a gate. The arm 14 may be an inward opening (e.g., FIG. 12) and/or outward opening (e.g., FIG. 1) gate. The inward opening gate may allow the arm 14 to hinge inward toward the body 12. That is, the arm 14 may hinge into a cavity 13 formed within the sides of the body 12. The outward opening gate may allow the arm 14 to hinge outward from the body 12. As will be described in more detail to follow, the arm 14 may be biased to a normally closed position (FIG. 2).

The arm 14 may include a gate body 18 and a gate cap 20. The gate cap 20 may be secured to the gate body 18 with threads 22. The threads 22 may be external threads on the gate cap 20 to mate with internal threads (not visible) on the gate body 18. Alternatively, the threads 22 may be internal threads on the gate cap 20 to mate with external threads on the gate body 18. Alternatively, the gate cap 20 may be secured to the gate body 18 with other connection types, such as, for example, latches, snap fit, friction fit, buttons, hinge, etc. The connection provided may allow for the gate cap 20 to be removed from the gate body 18 when the carabiner 10 is in the open position. The gate cap 20 may include a seal 24. The seal 24 may provide a fluid tight connection between the gate cap 20 and the gate body 18. The seal 24 may be an o-ring.

Figure 3:
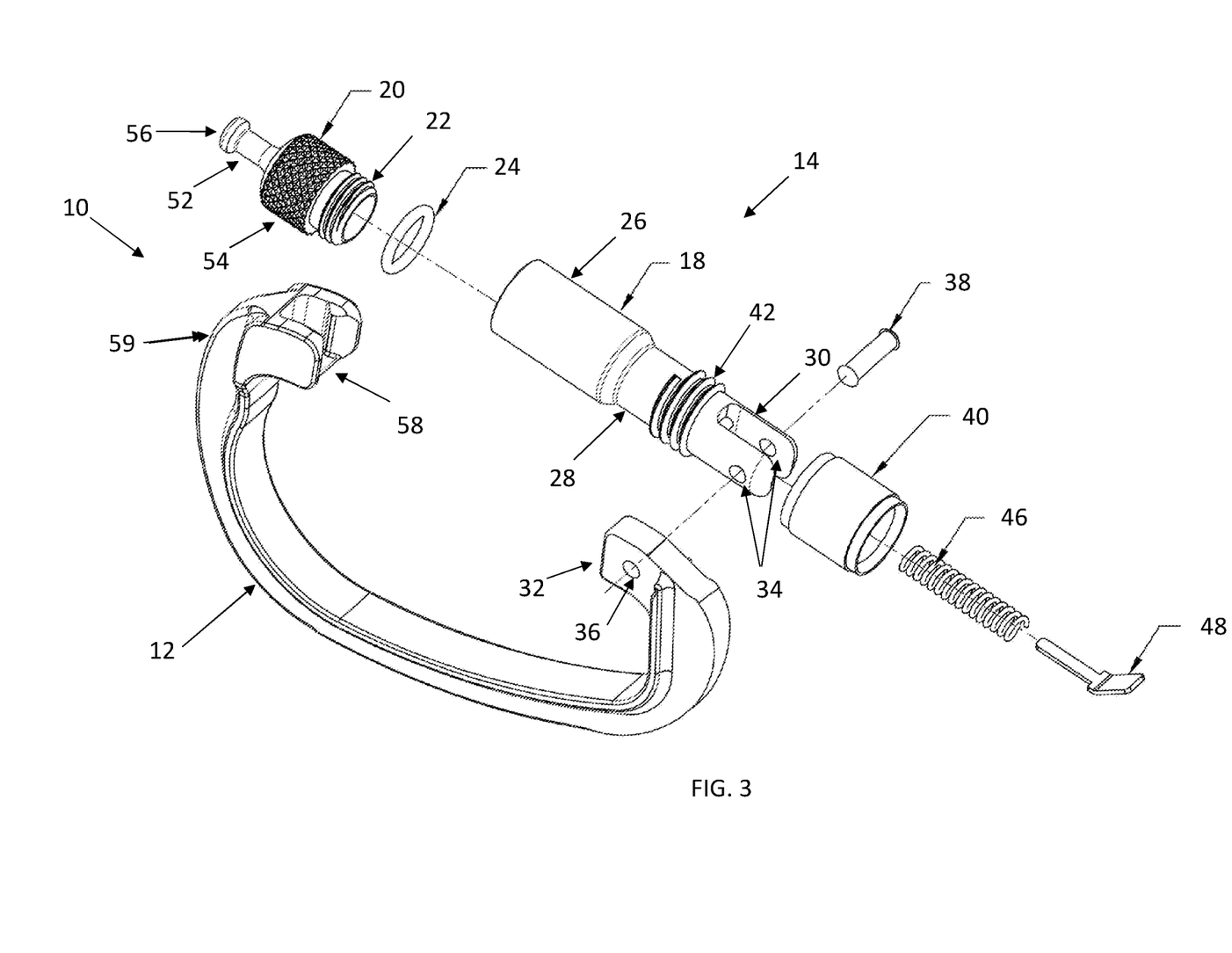
FIG. 3 shows a perspective exploded view of the carabiner with container gate of FIG. 1, according to an embodiment of the disclosure.

Referring to FIG. 3, the gate body 18 may have a substantially cylindrical body. The gate body 18 may have a first gate body portion 26 and a second gate body portion 28. The first gate body portion 26 may have a larger outer diameter than the second gate body portion 28. The second gate body portion 28 may have a split portion 30. The split portion 30 may receive an end 32 of the body 12. The split portion 30 may have apertures 34 that align with an aperture 36 on the end 32. When assembled, the split portion 30 may be placed such that the end 32 extends between two side walls of the split portion 30 with the apertures 34, 36 aligned. A rivet 38 may extend through the apertures 34, 36. The rivet 38 and apertures 34, 36 may provide the pivot point 16 (FIG. 1). A locking collar 40 may have threads 50 (FIG. 4) to be secured around threads 42 of the second gate body portion 28.

Figure 4:
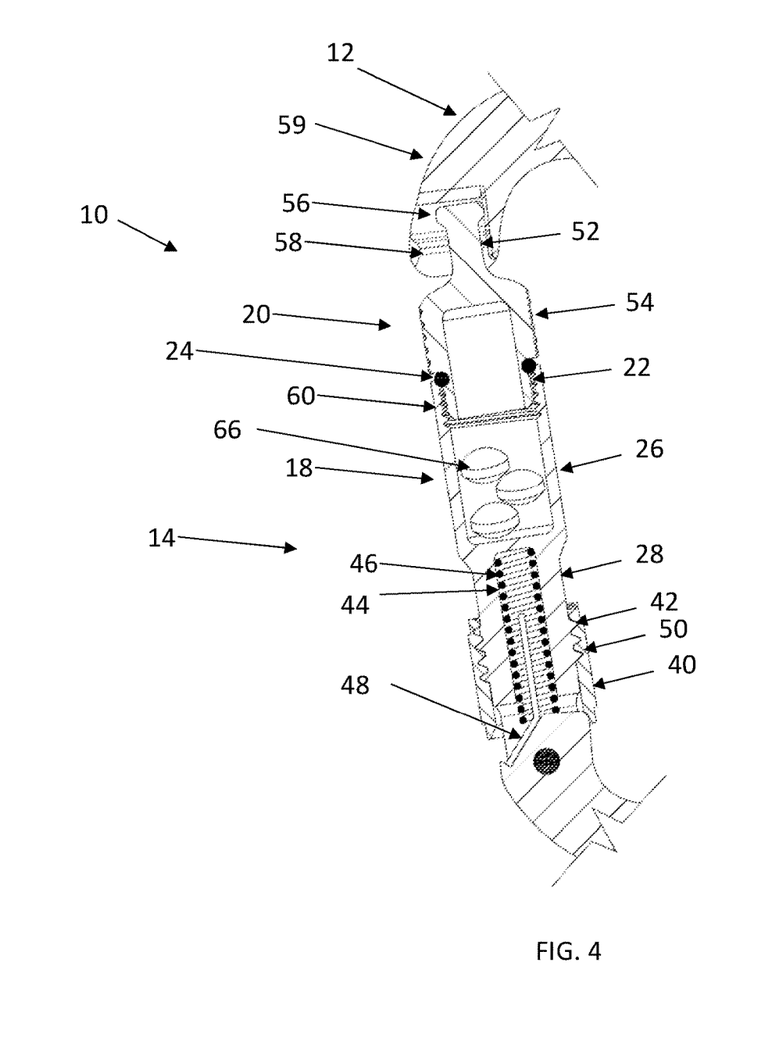
FIG. 4 shows a partial cross-section of the carabiner with container gate of FIG. 1, according to an embodiment of the disclosure.
Figure 5:
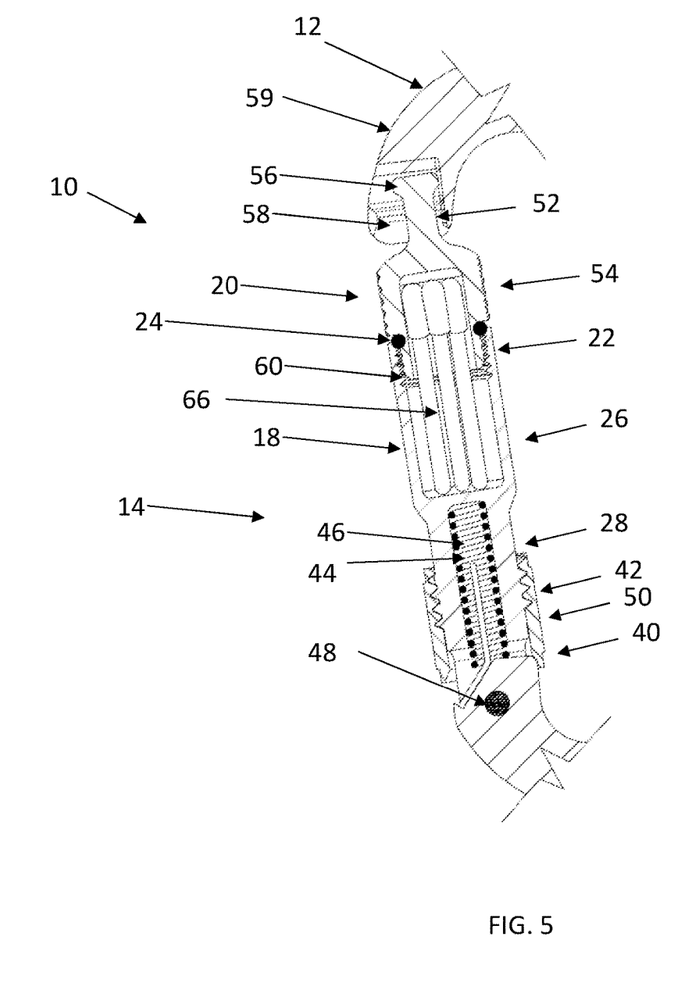
FIG. 5 shows a partial cross-section of the carabiner with container gate of FIG. 1, according to an embodiment of the disclosure.

With reference to FIGS. 3-5, the second gate body portion 28 may have an opening 44 for receiving a spring 46 and a spring link 48. The spring link 48 may extend within a bore formed by the spring 46. The spring 46 and spring link 48 may bias the arm 14 into the closed position (FIG. 2). The axis of the spring 46 may be offset from the rivet 38 such that the force of the spring 46 is directed to close the arm 14. The spring link 48 may transfer the spring force to the body 12 at a predetermined distance from the rivet 38. Depressing or opening the arm 14 may compress the spring 46, acting against the force of the spring 46. When the force is removed from the arm 14, the spring 46 may extend, moving the arm 14 into the normally closed position. As mentioned, the second gate body portion 28 may have threads 42 for coupling to threads 50 of the locking collar 40. Although depicted as external threads 42 and internal threads 50, the threads may be reversed such that threads 42 are internal threads and threads 50 are external threads. Alternate connection types may be provided to couple the locking collar 40 to the second gate body portion 28.

Figure 6:
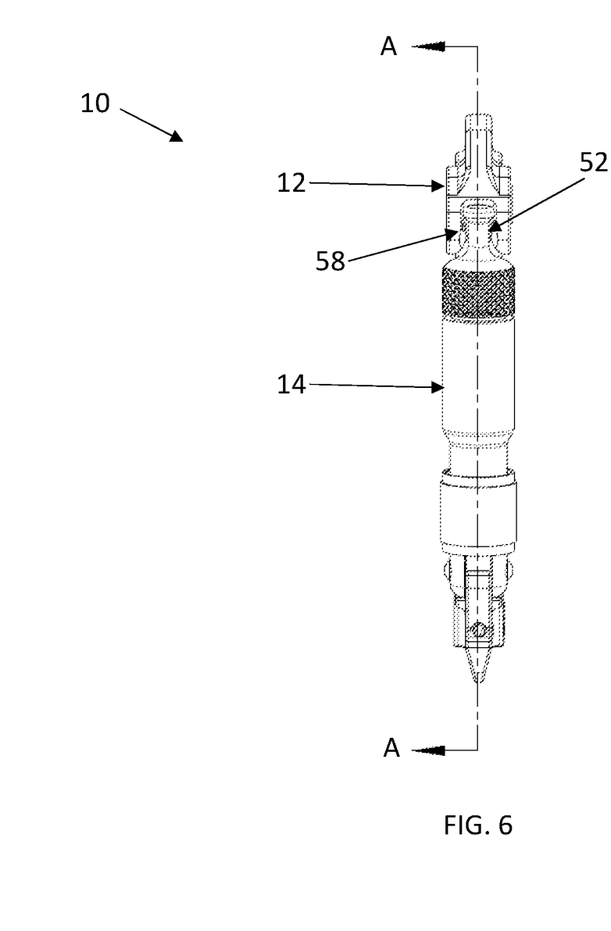
FIG. 6 shows a side view of the carabiner with container gate of FIG. 1, according to an embodiment of the disclosure.

The gate cap 20 may have a stem 52 and a body 54. The stem 52 may be substantially cylindrical with an enlarged top 56. The stem 52 with enlarged top 56 may be received within a groove or slot 58 formed in a nose 59 of the body 12. The stem 52 may include a chamfered section that may mate with a chamfered section in the slot 58. The chamfered sections may engage when the carabiner 10 undergoes a significant force. In this manner, the carabiner 10 may be used for a loaded condition (e.g., climbing). In the closed position of FIGS. 2 and 6, the stem 52 may be received within the slot 58. In this position, the arm 14 and the body 12 may form a closed ring. In the open position of FIG. 1, the stem 52 may be removed from the slot 58 and may extend outward or inward with respect to the body 12. Referring back to FIGS. 3-5, the stem 52 may have a smaller outer diameter than the body 54. The body 54 may have a textured outer surface. The body 54 may include the threads 22. As previously described, the threads 22 may interface or interact with threads 60 on gate body 18. A seal 24 may be provided on shoulder of the body 54. The seal 24 may be compressed or secured between the shoulder of the body 54 and a shoulder of the first gate body portion 26 when the threads 22 and 60 are engaged.

Figure 7:
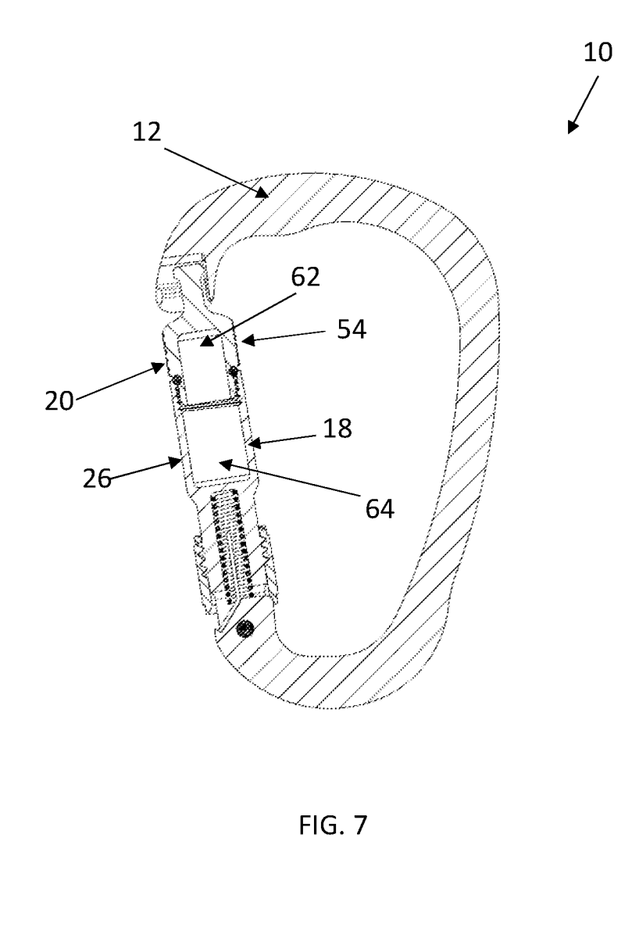
FIG. 7 shows a cross-sectional view of the carabiner with container gate of FIG. 6 along the axis A-A.
Figure 8:
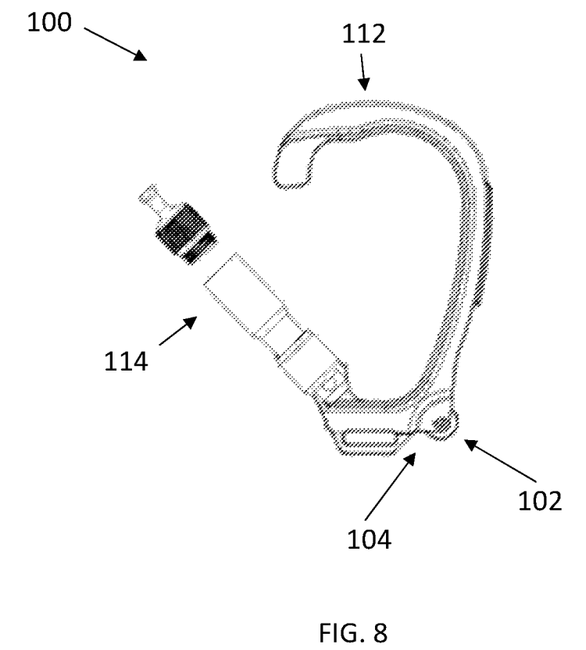
FIG. 8 shows a front view of a carabiner with container gate, according to an embodiment of the disclosure.
Figure 9:
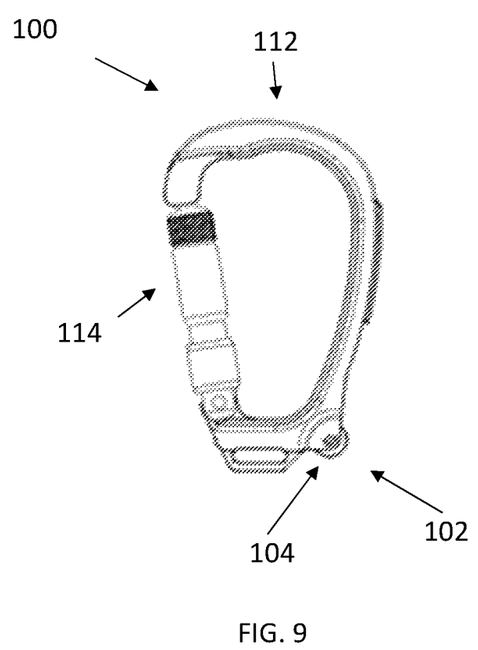
FIG. 9 shows a front view of the carabiner with container gate of FIG. 8 in a closed position, according to an embodiment of the disclosure.
Figure 10:
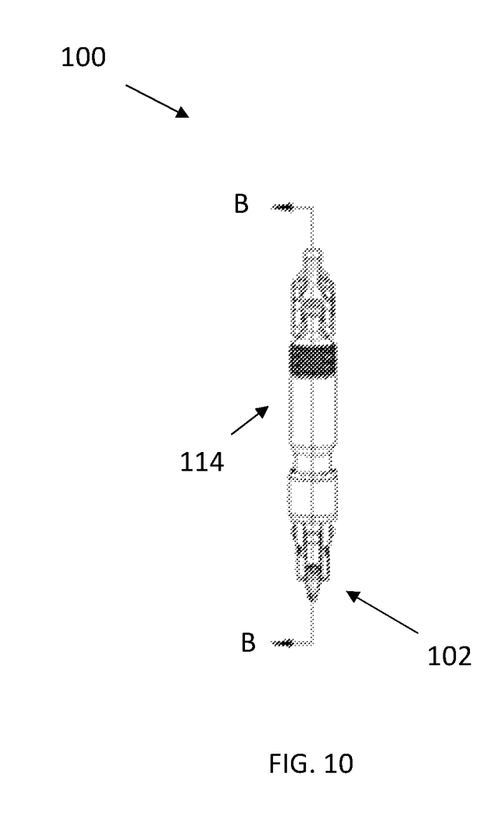
FIG. 10 shows a side view of the carabiner with container gate of FIG. 8, according to an embodiment of the disclosure.
Figure 11:
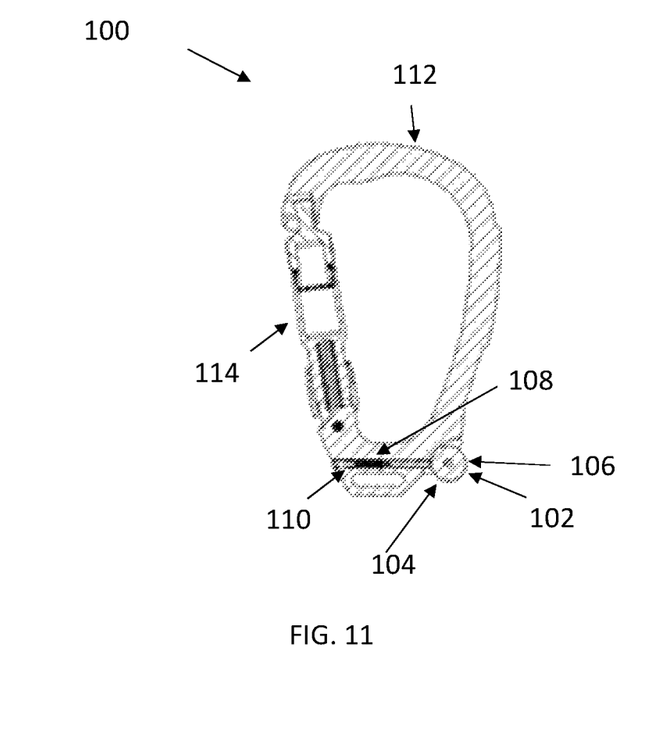
FIG. 11 shows a cross-sectional view of the carabiner with container gate of FIG. 10 along the axis B-B, according to an embodiment of the disclosure.

Referring to FIG. 7, the body 54 of the gate cap 20 may have a cavity 62. When the gate cap 20 is coupled to the gate body 18, the cavity 62 may connect or couple with a cavity 64 formed in the first gate body portion 26. The cavities 62, 64 may form a void or empty section. The cavities 62, 64, together or separately, may receive an item or plurality of items 66 (FIGS. 4 and 5). For example, in FIG. 4, the items 66 may be tablets or pills. In FIG. 5, the items 66 may be matches. Although tablets, pills, and matches are shown, any number of items may be provided in the cavities 62, 64, including, but not limited to medicine, matches, small suture kits, money, and other small items sized to fit within the cavities 62, 64. Accordingly, the arm 14 may provide a container formed of the gate body 18 and the gate cap 20. The container may allow for storage of items in a fluid tight matter. When the arm 14 is moved such that the stem 52 is no longer within the slot 58 and the arm 14 is in the open condition, a user may disconnect the gate cap 20 from the gate body 18. The user may unscrew or unthread the gate cap 20 from the gate body 18. When the gate cap 20 is removed from the gate body 18, the cavities 62, 64 are revealed and any contents or items may be placed within the cavities or removed therefrom. The gate cap 20 may be screwed or threaded back onto the gate body 18 and the arm 14 may be released, such that the arm 14 is biased back into the closed position. Although the cavities 62, 64 are depicted as substantially cylindrical, other shapes may be provided.

Referring to FIGS. 8-11, a carabiner 100 is shown, according to an embodiment. The carabiner 100 may be the same or similar as the carabiner 10. The carabiner 100 may include a fire starting implement 102 such as described in U.S. patent application Ser. No. 15/292,077, herein incorporated by reference in its entirety. The fire starting implement 102 may be located in a heel 104 of the body 112. The fire starting implement 102 may be located transverse to the arm 114. The arm 114 may be the same or similar as the arm 14 and may include a container as previously described. The fire starting implement 102 may include a spark wheel 106, a sparking material 108, and a spring 110. The spring 110 may bias the sparking material 108 into contact with the spark wheel 106. The sparking material 108 may be a flint, ferrocerium rod, or other sparking material. When the spark wheel 106 is rotated, the contact with the sparking material 108 may provide a spark for igniting material.

Figure 12:
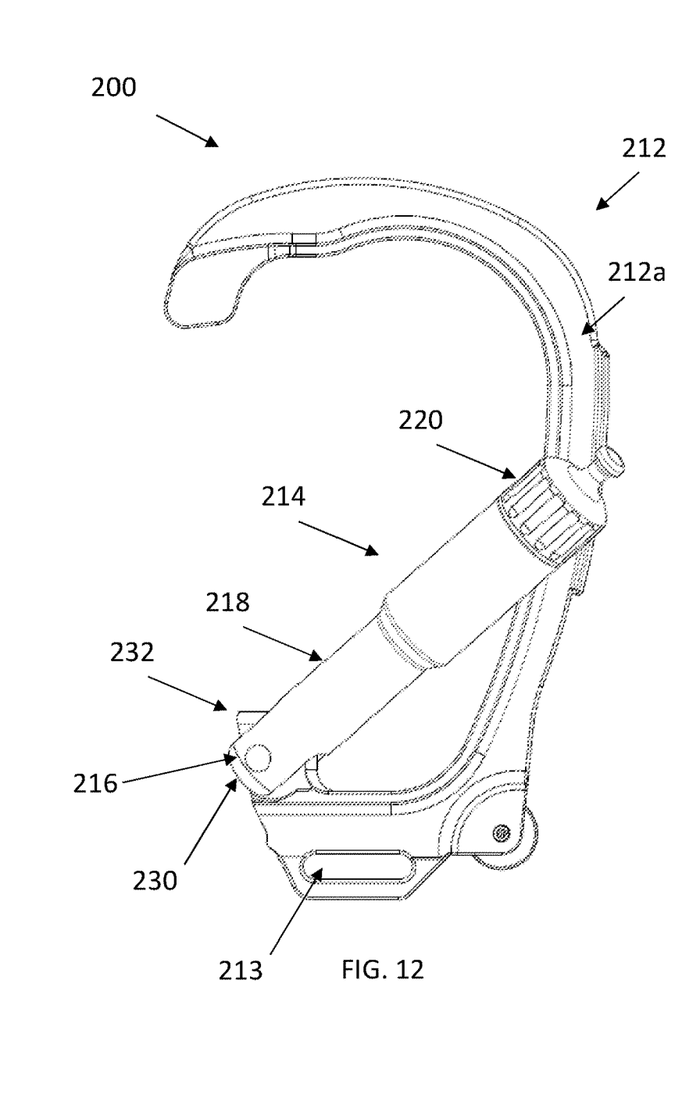
FIG. 12 shows a side view of a carabiner with container gate, according to an embodiment of the disclosure.
Figure 13:
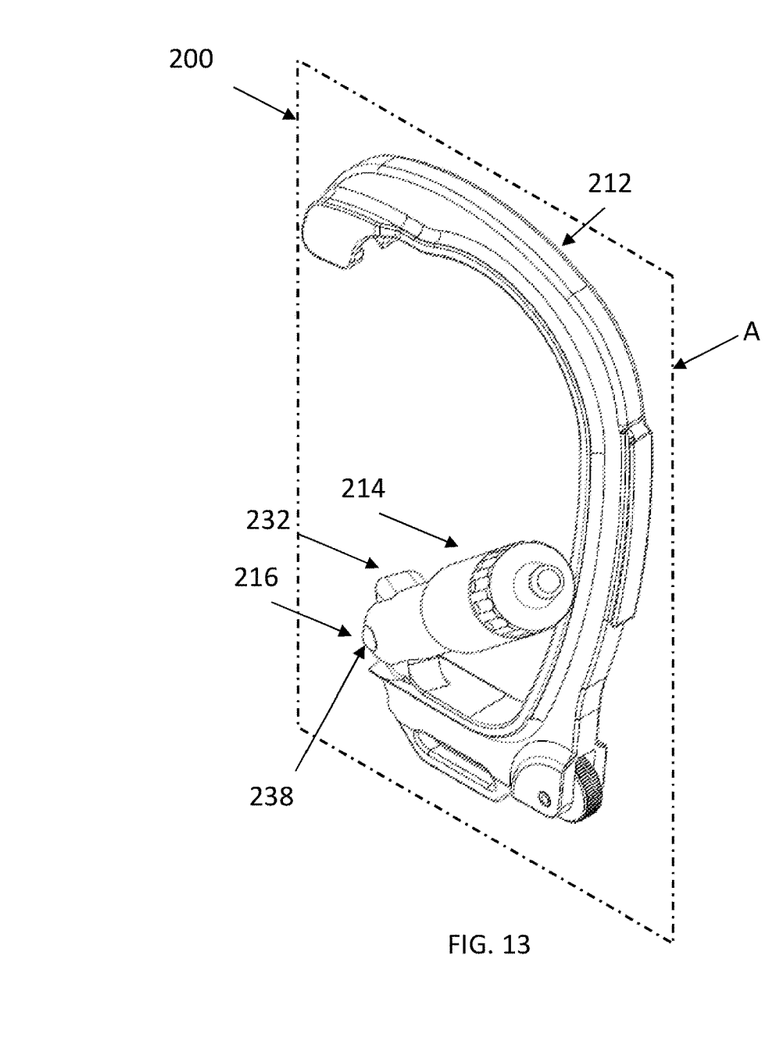
FIG. 13 shows a perspective view of the carabiner of FIG. 12, according to an embodiment of the disclosure.

Referring to FIGS. 12 and 13, another embodiment of a carabiner 200 is shown. The carabiner 200 may be the same or similar as the carabiner 10 and/or carabiner 100. The carabiner 200 may have a body 212 and an arm 214. The body 212 may include an opening 213. The opening 213 may allow for securing the carabiner 200 to an object. The arm 214 may be hinged to the body 212. The arm 214 may be coupled to the body 212 at a pivot point 216. The pivot point 216 may allow the arm 214 to hinge, pivot, or rotate with respect to the body 212. The pivot point 216 may allow the arm 214 to hinge inward with respect to the body 212. According to an embodiment, the arm 214 may pivot in a manner that is angled with respect to the body 212. The arm 214 may hinge between an open position (FIGS. 12 and 13) and a closed position. For example, the arm 214 may be a gate, such as an inward opening gate. The inward opening gate may allow the arm 214 to hinge inward toward the body 212. According to an embodiment, the arm 214 may be biased to a normally closed position against the carabiner body 212.

The arm 214 may include a gate body 218 and a gate cap 220. The gate cap 220 may be secured to the gate body 218 with a connection, such as, for example, threads, latches, snap fit, friction fit, buttons, hinge, etc. The connection provided may allow for the gate cap 220 to be removed from the gate body 218 when the carabiner 200 is in the open position. The gate cap 220 may include a seal (e.g., an o-ring) to provide a fluid tight connection between the gate cap 220 and the gate body 218. The gate body 218 and gate cap 220 may be the same as or similar to the gate body 18 and gate cap 20 as described in relation to FIGS. 3-7. The gate body 218 may include a split portion 230 such that an end 232 of the body 212 is received within the split portion 230. A rivet 238 may extend through apertures in the split portion 230 and the end 232 to provide the pivot point 216. A locking collar may be also be provided. The arm 214 may include an internal cavity such as previously described. The arm 214 may include a spring and spring link, such as previously described, or other biasing mechanism, to bias the arm 214 into the closed position.

With continued reference to FIGS. 12 and 13, the body 212 may have a plane A extending through the body 212. The plane A may be substantially parallel and aligned with a flat front and rear surface of the body 212. The end 232 of the body 212 may be angled or non-parallel with respect to the plane A. That is, a plane or axis extending through the end 232 may intersect the plane A. The arrangement of the end 232 may be angled with respect to plane A to allow for the arm 214 to hinge or rotate inward with respect to the body 212 and past a sidewall 212a of the body 212. This may allow for the gate cap 220 to be removed from the gate body 218 to allow access to the internal cavity without interference from the body 212.

Accordingly, the carabiner of the present disclosure may provide the added utility of creating a container or empty section within a solid gate or arm. A seal may be affixed to a gate cap to provide a water tight vessel area or cavity in the container. The gate body may have the standard pocket section to house a spring and spring link causing the arm to normally remain closed. The gate body may be provided with a pocket or void section to allow placement of items that are useful to the user carrying the carabiner. The gate cap may add to the internal space within the solid body gate or arm. The carabiner may be used for both loaded rated or non-loaded conditions. The carabiner may be opened inward with respect to the body or outward with respect to the body.

Although the foregoing description is directed to the preferred embodiments of the invention, it is noted that other variations and modifications will be apparent to those skilled in the art and may be made without departing from the spirit or scope of the invention. Moreover, features described in connection with one embodiment of the invention may be used in conjunction with other embodiments, even if not explicitly stated above.

The invention claimed is:

1. A carabiner comprising:
   a body; and
   a gate pivotally coupled to the body, the gate comprising:
      a gate body having a first gate body portion having a first cavity and a second gate body portion for pivotally coupling to the body;
      a gate cap removably coupled to the gate body, the gate cap having a second cavity configured to align with the first cavity to form a container; and
      a seal configured to provide a water tight seal for the container,
   wherein the container is configured to receive a stored item.

2. The carabiner of claim 1, wherein the gate cap is threadingly coupled to the gate body.

3. The carabiner of claim 1, the gate cap further comprising a stem and a body, the body having the second cavity, wherein the stem is configured to be received in a slot in a nose of the body.

4. The carabiner of claim 3, wherein the gate cap comprises a first chamfer configured to engage with a second chamfer in the slot, and
   wherein, when engaged, the first chamfer and the second chamfer provide a load bearing carabiner.

5. The carabiner of claim 1, wherein the second gate body portion comprises external threads, an opening, and a split portion.

6. The carabiner of claim 5, wherein the external threads are configured to engage a locking collar.

7. The carabiner of claim 5, wherein the opening is configured to receive a spring and a spring link, the spring configured to bias the gate into a normally closed condition with the body.

8. The carabiner of claim 5, wherein the split portion comprises a plurality of apertures configured to receive a rivet, the rivet configured to provide a pivoting coupling between the gate and the body.

9. The carabiner of claim 1, wherein, in a closed condition, the body and the gate form a closed ring.

10. The carabiner of claim 1, wherein the seal is placed on a shoulder of the gate cap and wherein, in a closed condition, the seal is compressed between the shoulder and a shoulder of the gate body.

11. The carabiner of claim 1, wherein the seal is an o-ring.

12. The carabiner of claim 1, further comprising a fire starting implement coupled to a heel of the body.

13. The carabiner of claim 12, the fire starting implement further comprising a spark wheel, a sparking material, and a spring.

14. The carabiner of claim 1, the gate configured to open outwardly with respect to the body.

15. The carabiner of claim 1, the gate configured to open inwardly with respect to the body.

16. The carabiner of claim 1, the body further comprising an end configured to provide a pivot point for the gate, wherein the end is parallel with respect to a plane extending through the body.

17. The carabiner of claim 1, the body further comprising an end configured to provide a pivot point for the gate, wherein the end is angled with respect to a plane extending through the body.

* * * * *